United States Patent [19]
Isley

[11] Patent Number: 5,727,610
[45] Date of Patent: Mar. 17, 1998

[54] COMBINED TREE FELLER AND PROCESSOR

[75] Inventor: Reggald Emory Isley, Grand Prairie, Canada

[73] Assignee: Risley Enterprises Ltd., Grand Prairie, Canada

[21] Appl. No.: 643,051

[22] Filed: May 2, 1996

[51] Int. Cl.⁶ .................................................. A01G 23/08
[52] U.S. Cl. ........................ 144/4.1; 144/336; 144/338
[58] Field of Search ................................. 144/24.13, 4.1, 144/34.1, 335, 336, 338; 414/680, 694, 695, 695.5, 695.7, 695.8

[56] References Cited

U.S. PATENT DOCUMENTS

| | | | |
|---|---|---|---|
| 4,108,224 | 8/1978 | Wirt | 144/4.1 |
| 4,412,777 | 11/1983 | Forslund | 144/4.1 |
| 4,800,936 | 1/1989 | Pomies et al. | 144/336 |
| 4,881,582 | 11/1989 | Ketonen | 144/4.1 |
| 5,082,036 | 1/1992 | Vierikko | 144/338 |
| 5,113,919 | 5/1992 | MacLennan | 144/4.1 |
| 5,129,438 | 7/1992 | Hamilton | 144/338 |
| 5,291,926 | 3/1994 | Jansson | 144/4.1 |
| 5,390,715 | 2/1995 | Luscombe | 144/4.1 |
| 5,441,090 | 8/1995 | Hill et al. | 144/4.1 |

*Primary Examiner*—W. Donald Bray
*Attorney, Agent, or Firm*—Oyen Wiggs Green & Mutala

[57] ABSTRACT

A combined tree feller processor has a head mounted to a boom with a three-axis coupling. The coupling allows an operator to control the orientation of the head. The head has tree processing means and a continuously rotating high speed saw for cutting trees. While trees are being cut the head is held firmly with respect to rotation about a third generally vertical axis. After a tree has fallen the third axis is in a horizontal position and is perpendicular to the longitudinal axis of the head. The head is allowed to float with respect to the third axis as the tree is processed.

7 Claims, 7 Drawing Sheets

FIG. 7

# 5,727,610

COMBINED TREE FELLER AND PROCESSOR

FIELD OF THE INVENTION

This application relates to a machine for felling and processing trees. In a preferred embodiment, the invention relates to a machine for felling a tree and then de-limbing and/or bucking the tree.

BACKGROUND OF THE INVENTION

Tree felling machines can be broken into two categories, feller bunchers and feller processors. Feller bunchers are used for felling and piling trees. A feller buncher has a boom with a head mounted at the end of the boom. The head has arms or other means for gripping a tree and a saw for cutting the tree at the base. A saw is provided in the head for cutting the tree. After the tree has been cut, the cut tree can be processed by another machine before being shipped to its ultimate destination. Some examples of processing are de-limbing and bucking to length.

The most efficient feller bunchers have a continuously rotating high-speed saw for cutting trees off at the base. A high speed continuously rotating saw is preferred to other types of saw, such as intermittent circular saws and chain saws, because a high speed saw cuts trees much more quickly than these other saws and requires much less maintenance than a chain saw. High speed saws rotate substantially continuously at angular speeds on the order of 1000 r.p.m. and typically about 1200 r.p.m. A high speed saw may be 1.3 meters in diameter. The rotating blade of a typical 1.3 meter diameter high speed saw weighs about 300 kilograms. An example of a state-of-the art feller buncher equipped with a high speed saw is a RISLEY™ model H2000T feller buncher available from Risley Equipment Ltd. of Grande Prairie, Alberta, Canada.

As described in more detail below, the head of a feller buncher is typically mounted to the boom of a feller buncher with a joint which has two degrees of freedom. The head can be tilted toward, or away from, the machine about a first axis transverse to the boom. The head may also be tilted, to a limited degree, from side to side about a second transverse axis, which is generally longitudinal to the boom when the head is upright. These two degrees of freedom allow the head to be aligned with a tree which is not perfectly vertical. After the tree has been cut, the head can be tilted about the first axis to lay the cut tree on the ground.

In a feller buncher with a high speed saw the motions of the head must be rigidly controlled because the rotating high speed saw acts as a gyroscope with a very large angular momentum. Any motion of the head which changes the direction of the axis of rotation of the high speed saw causes very large forces in a direction perpendicular to the plane in which the axis of rotation of the high speed saw moves.

Tree felling and processing machines, or "feller processors" are machines which can both cut trees and process the cut trees. Like a feller buncher, a typical feller processor has a head with a saw for cutting trees mounted to the end of a boom. However, in a feller processor, the head includes a processor. The processor typically includes a pair of feed rolls for moving the trunk of a cut tree relative to processing means on the head. The processing means may be, for example, a set of de-limbing knives or a bucking saw. The head of a feller processor must have sufficient degrees of freedom to move relative to the boom to lay trees down transversely to the boom for processing. After the tree is down the feed rolls are actuated to move the cut tree past the processing means. Unlike a feller buncher, the head in a feller processor must be free to freely tilt back and forth or "float" about a horizontal axis perpendicular to the tree while the tree is being processed. This allows the tree to seesaw as it moves past the head during processing.

Typical feller processors such as the model DH550 feller processor available from Denharco of Saint Hyacinthe, Quebec, Canada have a head which is completely free floating and is suspended from the end of the boom by a universal joint. Such feller processors are equipped with intermittent saws. The gyroscopic forces produced by a continuously rotating high speed saw would make such feller processors very difficult to control. An "intermittent saw" is brought into rotation for each cut and is allowed to substantially slow down, or stop altogether, between cuts. An intermittent saw typically has a circular blade which is lighter in weight and smaller in diameter than the blade of a high speed saw. The maximum angular speed of a typical intermittent saw is typically in the range of 300 r.p.m. to 600 r.p.m. and may be as much as 800 r.p.m. Intermittent saws are designed to have a low moment of inertia so that they can be quickly brought up to speed.

A problem with currently available feller processors is that they use chain saws or intermittently operated circular saws to cut trees. No successful feller processors known to the applicant use a continuously operated high speed rotary saw for cutting trees. As noted above, such saws are known to cut faster and more efficiently than the saws that are now used in tree feller processors. However, mounting a feller processor head to a boom in a manner which provides the necessary "floating" action during processing generally precludes the use of a high speed continuously rotating saw for tree cutting because such a mounting would be incapable of controlling the saw under the action of the large gyroscopic forces described above.

The ULTIMATE™ model 5300 feller processor, from Ultimate Forest Products Ltd. of Grande Prairie, Alberta, Canada has a processing head connected to a boom with a coupling which allows the head to tilt from side to side. When the head is tilted to the side, the coupling permits the head to rock about its longitudinal axis. As the head is brought upright from its tilted position, ramped surfaces on the head ride up ramped surfaces on the coupling until, when the head is vertical, the head cannot rock about its longitudinal axis. This type of coupling is not completely satisfactory because it cannot provide control over the rocking of the head when the head is tilted to the side.

SUMMARY OF THE INVENTION

This invention provides a tree feller processor having a head incorporating processing means and a continuously rotating high speed saw. The head is mounted to a boom by means of a three-axis coupling which alleviates the disadvantages mentioned above while allowing processing to take place with a high speed saw continuously rotating. The coupling provides control over rotation of the head about each of the three axes.

A preferred embodiment of the invention provides: a tree felling and processing machine comprising: a boom having an end mounted to a vehicle and a free end; a first member pivotally mounted to the free end of the boom for pivoting about a first generally horizontal axis; a hydraulic cylinder linked between the boom and the first member for tilting the first member about the first axis; a second member pivotally mounted to the first member for pivoting about a second axis perpendicular to the first axis; a second actuator linked between the first member and the second member for tilting the second member about the second axis; a hydraulic control circuit for selectively causing the second actuator to either float or to firmly hold the second member at a selected degree of tilt relative to the first member; a processor head mounted to the second member by a rotary coupling, the rotary coupling permitting the processor head to pivot about a third axis perpendicular to the first and second axes; a ring gear on the second member; and a hydraulic motor on the processor head driving a pinion gear engaged with the ring gear for rotating the processor head about the third axis. The processor head comprises: a tree-engaging grapple for engaging a tree while the tree is cut; tree processing means; and a tree feeder for moving a cut tree past the tree processing means; and, a substantially continuously rotating circular saw for cutting the tree.

Another preferred embodiment of the invention provides a tree felling and processing machine comprising: a boom; a processor head mounted at an end of said boom; and, a coupler connecting said processor head to said boom. The processor head comprises: a tree-engaging grapple for engaging a tree while the tree is cut; tree processing means; and, a tree feeder for moving a cut tree past said tree processing means. The coupler comprises: a first member pivotally connected to said boom for pivotal motion about a first axis transverse to said boom; a second member pivotally connected to said first member about a second axis perpendicular to said first axis and pivotally coupled to said processor head about a third axis perpendicular to said first axis; power actuators operatively associated with said first, second and third axes for pivoting said processor head with respect to said first, second and third axes respectively. The actuator associated with said second axis is selectively configurable to hold said second member fixed with respect to said tilt member or to float with respect to said tilt member.

BRIEF DESCRIPTION OF THE DRAWINGS

By way of illustration, the preferred embodiment of the invention will now be described with reference to the following drawings in which.

DETAILED DESCRIPTION OF THE PREFERRED EMBODIMENTS OF THE INVENTION

Figure 1A:
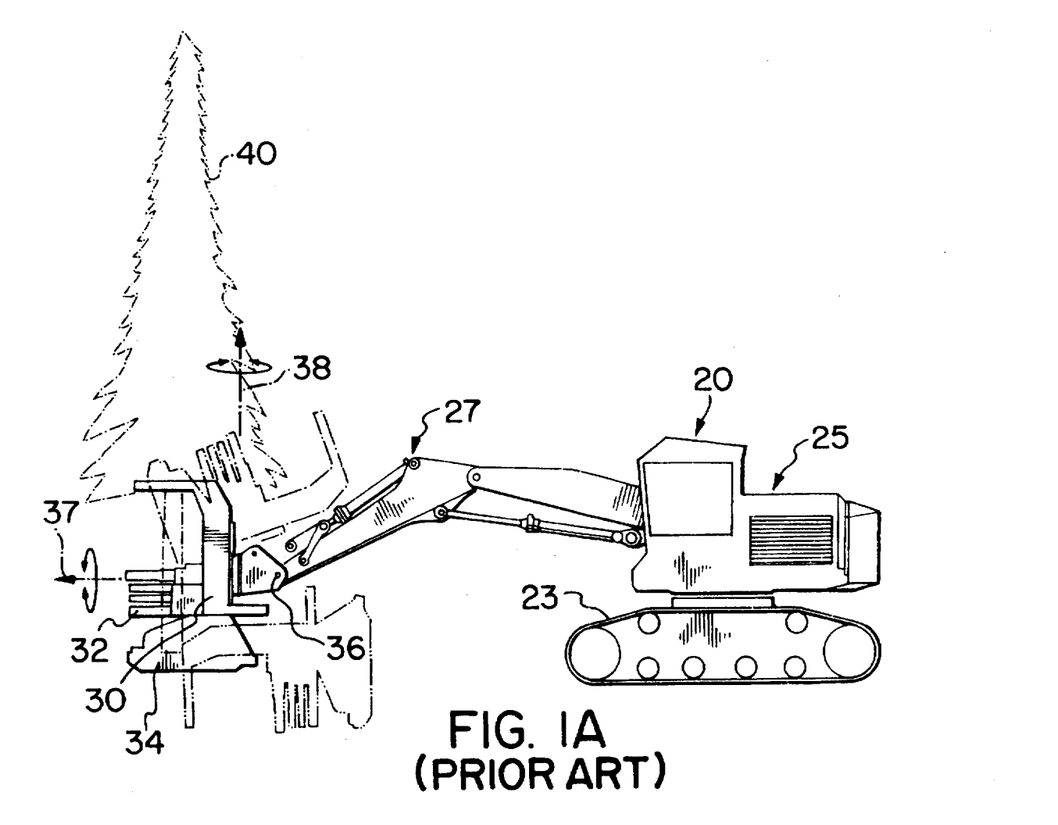
FIG. 1A and 1B are schematic views of a prior art feller buncher showing the degrees of freedom of the head.
Figure 1B:
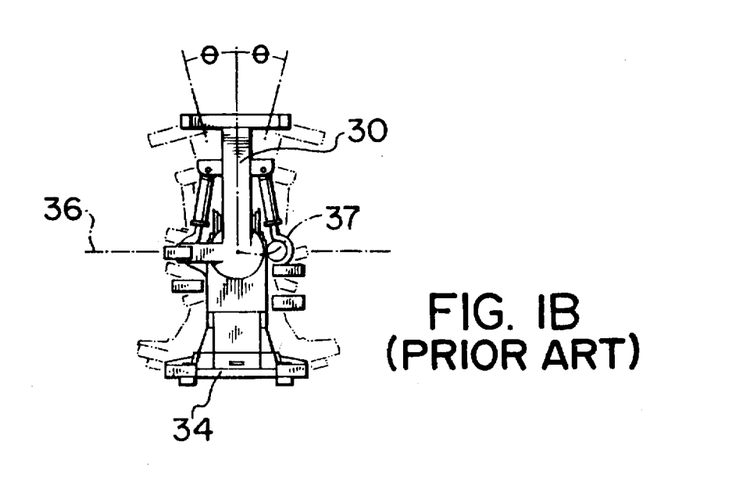

FIG. 1A shows a prior art forestry machine 20 equipped with a felling head 30. FIG. 1B is a front view of the head 30 of FIG. 1A. Machine 20 has an off-road undercarriage 23, a superstructure 25 mounted atop undercarriage 23 and a movable boom 27 extending from superstructure 25. Felling head 30 has a pair of grappling arms 32 for holding a tree 40 and a high speed saw 34 for efficiently cutting trees off at their bases. As shown in FIGS. 1A and 1B, felling head 30 is pivotally mounted at the end of boom 27 so that an operator of machine 20 can align head 30 with a tree 40 to be cut even if the tree 40 is not growing vertically. The extremes of the range of motion of head 30 about an axis 36, which is transverse to boom 27 are shown in dotted outline in FIG. 1A. The extremes of the range of motion of head 30 about an axis 37 which is perpendicular to axis 36 are shown in dotted outline in FIG. 1B. Head 30 has a limited range of motion θ (typically about 15 degrees to either side) about axis 37 and a greater range of motion about transverse axis 36.

As shown in FIG. 1A, before a tree 40 is cut, head 30 is aligned with tree 40. The operator then grabs tree 40 with grapples 32 and cuts tree 40 by advancing high speed saw 34. Then the operator tilts head 30 forward about transverse pivot axis 36 and lays cut tree 40 on the ground.

Rotation of head 30 about either one of pivot axes 37 or 36 changes the plane of rotation of high speed saw 34. Therefore, if head 30 is rotated quickly about either one of axes 37 or 36, then head 30 must be held with respect to the other one of axes 37 or 36 to maintain control over the motion of head 30. If head 30 were allowed to "float" with respect to one of axes 37 or 36 while head 30 was quickly rotated about the other one of axes 37 or 36 then gyroscopic forces resulting from the change in orientation of turning high speed saw 34 would cause head 30 to swing about the floating axis. This would make machine 20 difficult to control.

Figure 2A:
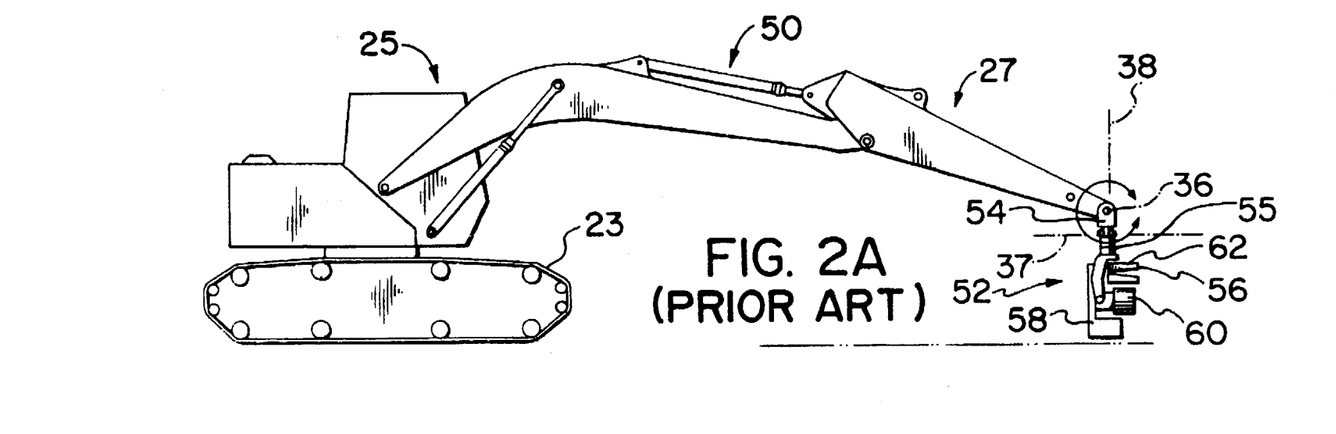
FIGS. 2A and 2B are side and front diagramatic views respectively of a prior art feller processor having a suspended head.
Figure 2B:
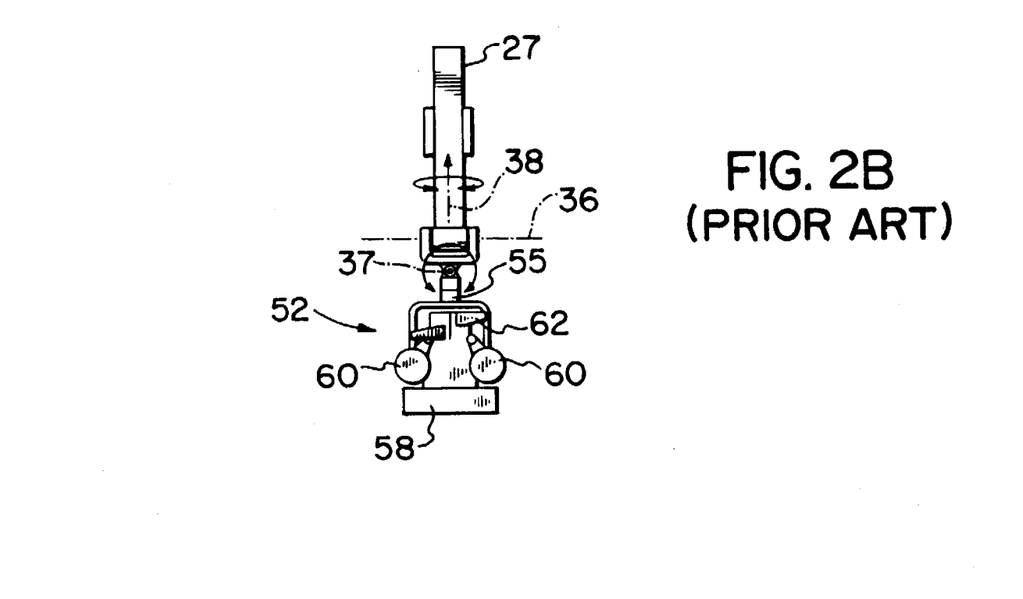

FIGS. 2A and 2B shows a prior art feller processor 50. The feller processor of FIGS. 2A and 2B differs from the feller buncher machine 20 of FIGS. 1A and 1B in the design of the head 52 and the coupling by which head 52 is mounted to boom 27. Head 52 is suspended from boom 27 by a universal joint 54. Universal joint 54 allows head 52 to pivot freely about longitudinal axis 37 and transverse axis 36. A rotary coupling 55 allows the operator of feller-processor 50 to rotate head 52 about an axis 38 which is longitudinal to head 52. As the center of gravity of head 52 is below universal joint 54, head 52 tends to remain vertical (with axis 38 vertical) when it is not being subjected to any external forces. When the operator of feller processor 50 moves head 52 against a tree, head 52 aligns itself with the tree.

Head 52 has: a pair of grappling arms 56 for gripping a tree; a cutoff saw 58, which may be either an intermittently operated rotary saw or a chain saw, for cutting the tree; processing means such as a set of de-limbing knives 62 for processing the tree; and a tree feeder comprising a pair of feed rolls 60 for moving the tree along relative to the processing means (e.g. de-limbing knives 62) after the tree has been felled. De-limbing knives 62 may comprise sharpened edges on grapling arms 56 as shown.

The operator of feller processor 50 brings head 52 against a tree 40 and engages the tree with grappling arms 56. With the tree securely gripped, the operator cuts the tree at its base with saw 58. Tree 40 falls after it has been cut. The operator can influence the direction that tree 40 falls by swinging boom 27 in the desired direction of fall. As tree 40 falls, head 52 pivots about axis 37 until both the tree and head 52 are generally horizontal. After tree 40 has fallen, the operator engages the tree with feed rolls 60 and loosens grappling arms 56. The operator then activates feed rolls 60 to drive tree 40 past de-limbing knives 62. As feed rolls 60 move tree 40 along head 52, head 52 pivots about axis 37 to follow tree 40. This is important because if head 52 does not "follow" tree 40 as tree 40 moves along it is likely that tree 40 will break.

Figure 3A:
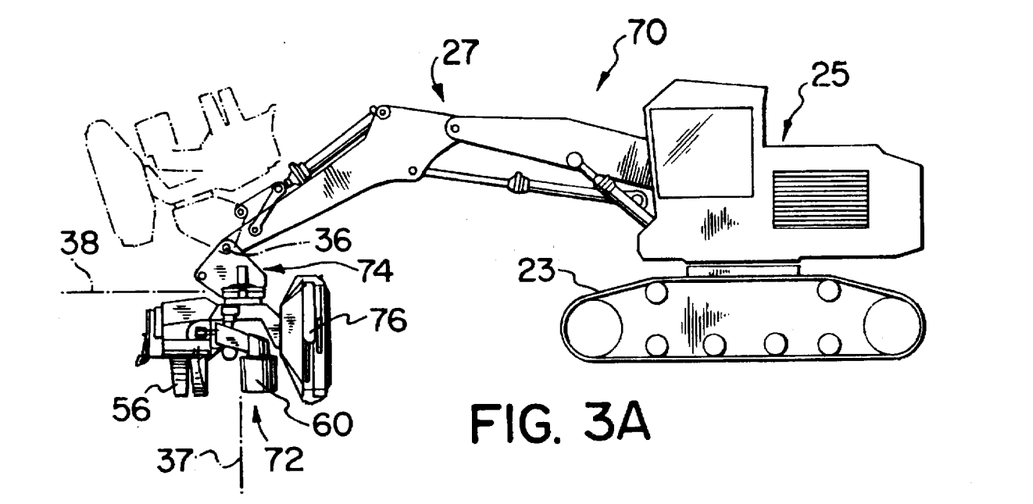
FIGS. 3A and 3B are respectively side and front elevational views of a feller processor according to the invention showing the degrees of freedom of the head.
Figure 3B:
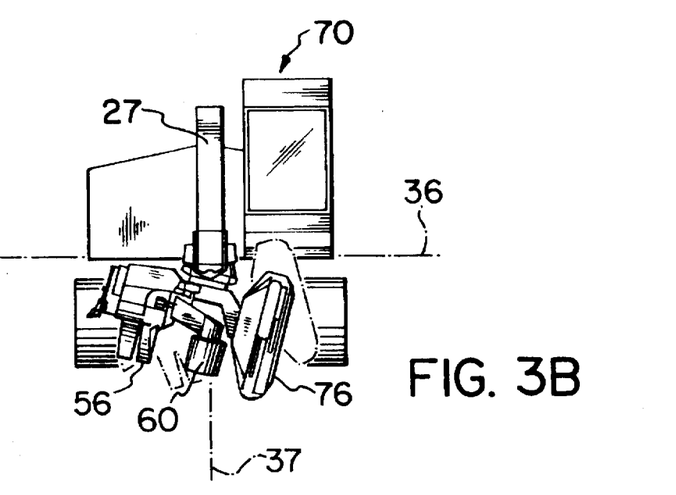

FIGS. 3A and 3B show a feller processor 70 according to the invention. Feller processor 70 has an undercarriage 23, a superstructure 25, and a boom 27 as described above. A head 72 is attached at the end of boom 27 with a coupling 74. Head 72 operates in substantially the same manner as head 52 of the prior art feller processor shown in FIGS. 2A and 2B except that head 72 preferably incorporates a high speed continuously rotating saw 76 in place of the chain saw or intermittent saw 58 used in the prior art feller processor. High speed saw 76 preferably operates at a rotational spped of at least 1000 revolutions per minute and is preferably in the range of 0.8 meters to 1.3 meters in diameter. The gyroscopic forces generated when the axis of rotation of a rotating high speed saw is tilted rule out the use of a high speed saw in feller processors of the type shown in FIGS. 2A and 2B where the head is not held rigidly while the head is brought up to a tree and when the tree is brought down. In FIGS. 3A and 3B, the parts of head 72 are numbered with the same reference numerals as are used to identify like parts in head 52 of FIGS. 2A and 2B.

Coupling 74 permits the operator of feller processor 70 to tilt head 72 about each of three perpendicular axes, a first axis 36 transverse to boom 27, a second axis 37 which, when head 72 is upright, is generally horizontal and longitudinal to boom 27, and a third axis 38 which is longitudinal to a first member 78, which is pivotally mounted to boom 27 for rotation about axis 36. Second axis 37 moves with and projects at least generally perpendicularly to first member 78. As head 72 is tilted forwardly about first axis 36, third axis 38 moves through a vertical position to a horizontal position and second axis 37 dips below the horizontal. Power actuators are provided for tilting head 72 relative to each axis 36, 37, 38.

Figure 4:
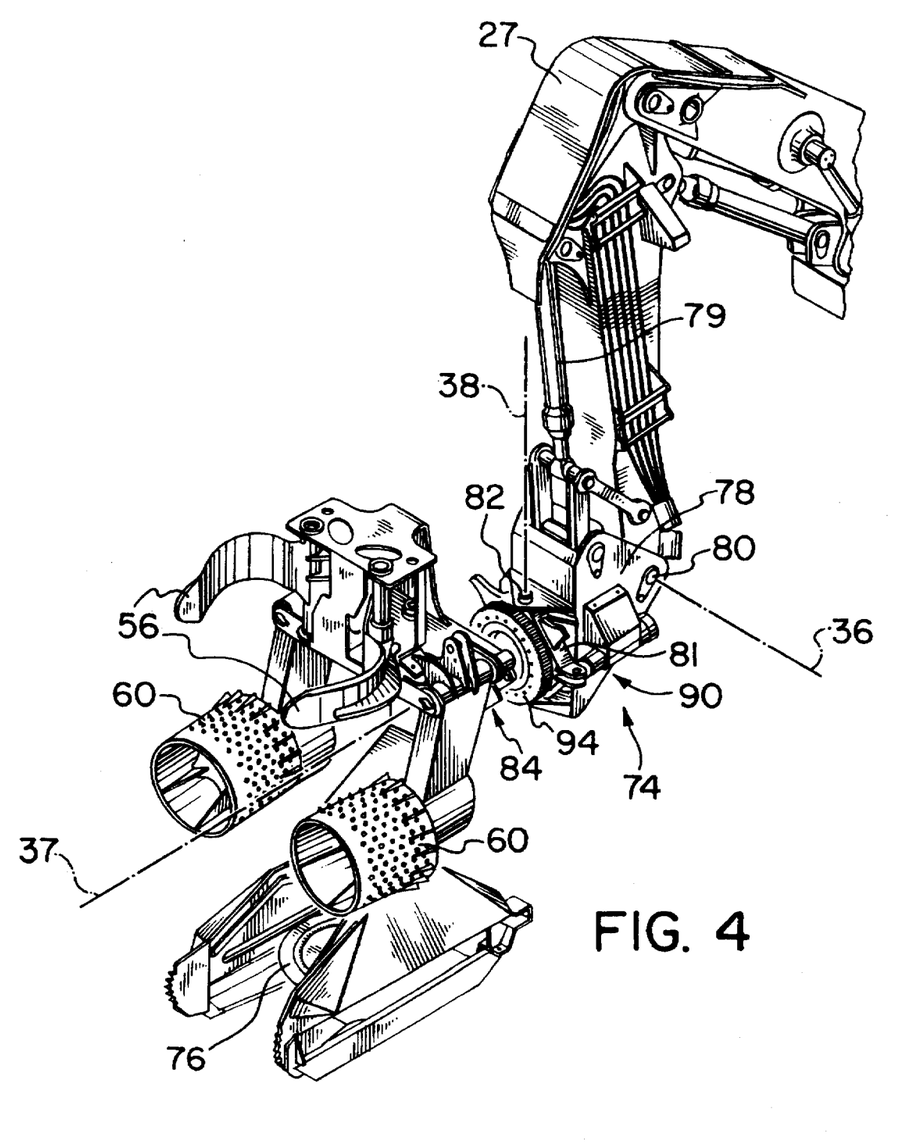
FIG. 4 is a partially disassembled perspective view of the boom-head coupling in a feller processor according to the invention.
Figure 5:
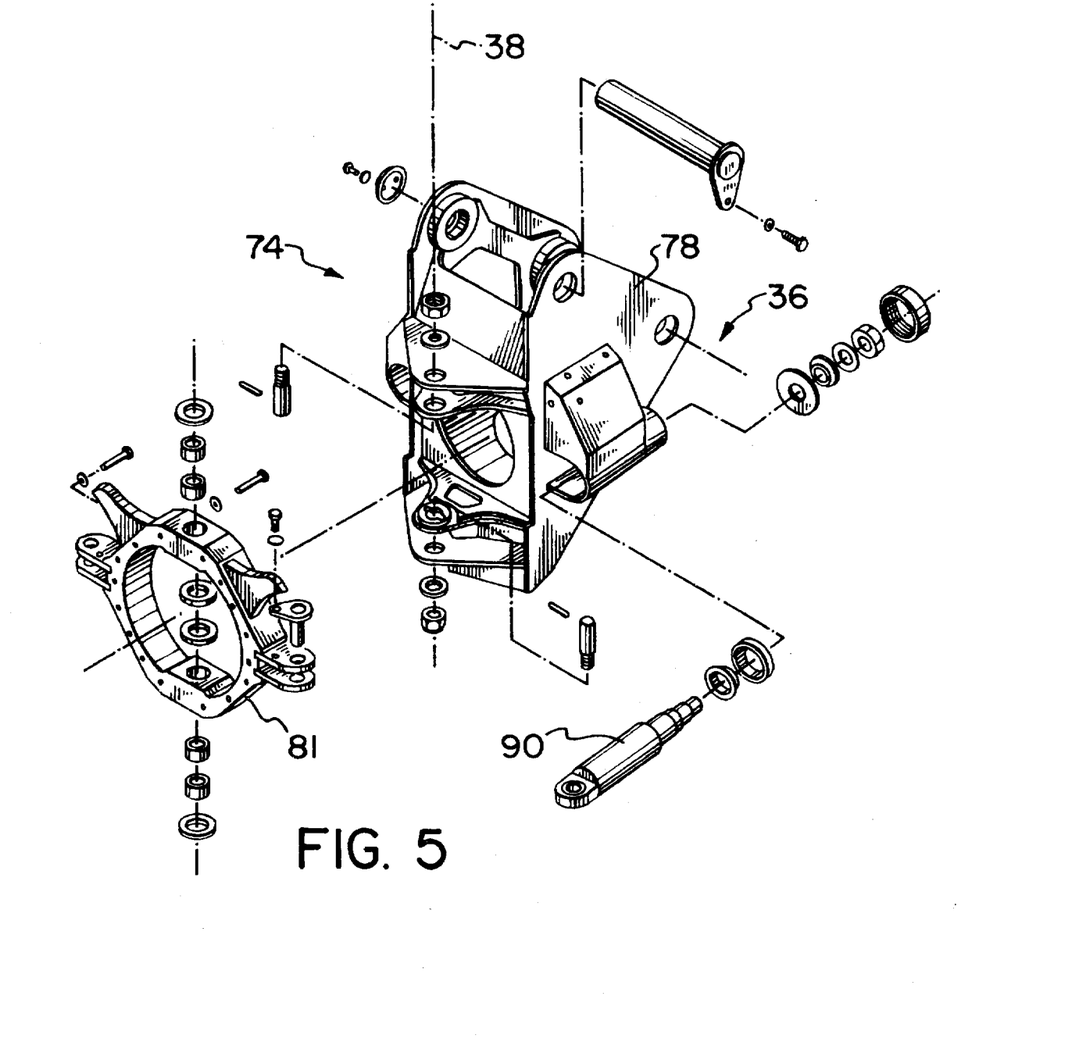
FIG. 5 is an exploded view showing parts of the boom-head coupling of FIG. 4.

As shown in FIGS. 4 and 5, coupling 74 preferably comprises: a first member 78 pivotally coupled to the end of boom 27 at a first pivot joint 80; a second member 81 coupled to tilt member 78 by a second pivot joint 82 which is perpendicular to pivot joint 80; and a rotary joint 84 connecting second member 81 to head 72 (In FIG. 5, rotary joint 84 is disconnected for clarity). First pivot joint 80 pivots on transverse axis 36. Second pivot joint 82 pivots on axis 38, which is preferably perpendicular to axis 36. Rotary coupling 84 allows head 72 to rotate about axis 37, which is preferably perpendicular to both of pivot axes 36 and 38.

A power actuator 79, which is preferably a power jack, and most preferably a hydraulic cylinder extends between boom 27 and first member 78. The operator of feller processor 70 can tilt first member 78 forwardly about pivot axis 36 by extending power actuator 79. The range of motion of first member 78 is preferably sufficient to tilt pivot axis 37 at least between a generally horizontal position and a generally vertical position.

One, or preferably two power actuators 90, which are preferably hydraulic cylinders, extend between first member 78 and second member 81. Power actuators 90 are preferably on either side of axis 38. The operator can tilt second member 81 relative to tilt member 78 about axis 38 by extending one of power actuators 90 while retracting the other one of power actuators 90. The range of motion of second member 81 about axis 38 should be 7 or more degrees to either side and is more preferably in the range of 15 degrees to 45 degrees to either side.

Figure 6:
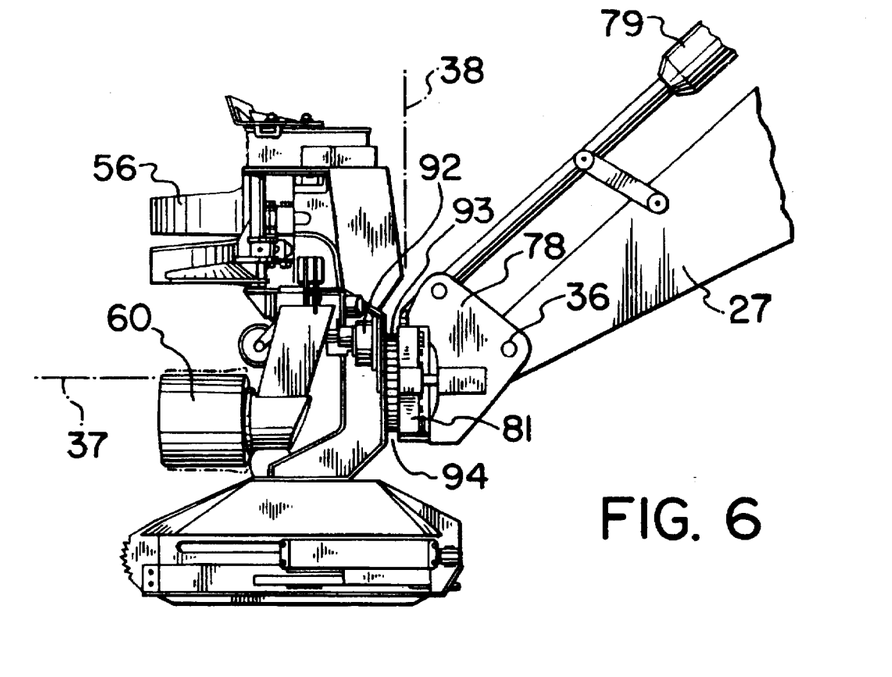
FIG. 6 is a side elevation of a feller-processor head and coupling according to the invention.

As shown in FIG. 6, a power actuator 92 is provided to turn head 72 about axis 37. Power actuator 92 preferably comprises a rotary actuator, and most preferably comprises two hydraulic motors mounted on head 72. Power actuator 92 turns head 72 about axis 37 by way of pinion gears 93 (FIG. 6) and ring gear 94. Two motors are preferred so that forces due to torques on head 72 are distributed between two pinion gears 93. The operator can rotate head 72 relative to second member 81 about rotary coupling 84 by actuating power actuator 92. Hydraulic power may be provided to head 72 via hydraulic hoses which pass through the centre of ring gear 94. The hoses are preferably flexible and/or equipped with swivels to allow head 72 to be tilted by at least 120 degrees to either side.

It will be appreciated by anyone skilled in the art of designing forestry equipment that power actuators 79, 90 and 92 may be any suitable actuators for tilting head 72 about pivot axes 36, 76 and 37 respectively. In some embodiments only one actuator 90 or one hydraulic motor 92 may be required.

Figure 7:
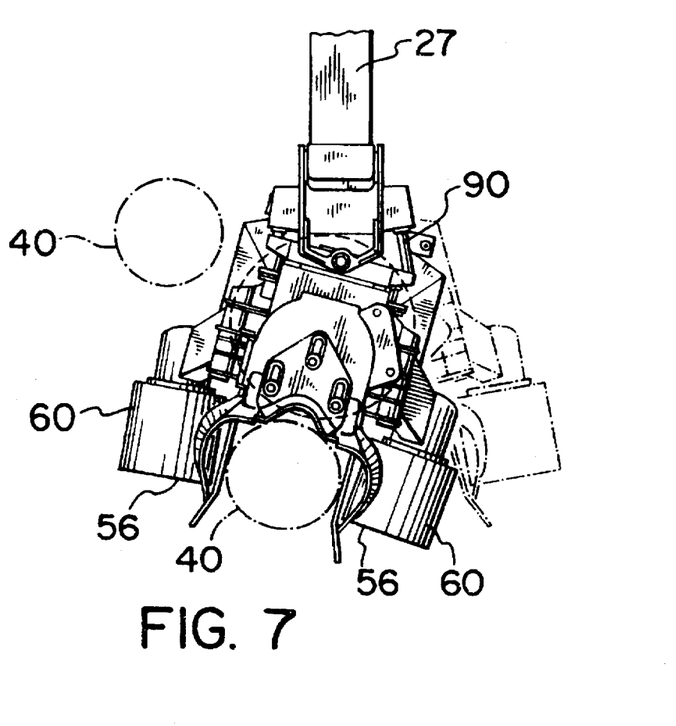
FIG. 7 is a top plan view of a feller processor head and coupling according to the invention.

As shown in FIG. 7, a further advantage of the feller processor of the invention is that head 72 can be tilted about axis 38 to selectively cut a tree which is behind another tree relative to the superstructure of feller processor 70. This is not easily possible with prior art feller processors.

Figures 8A, 8B:
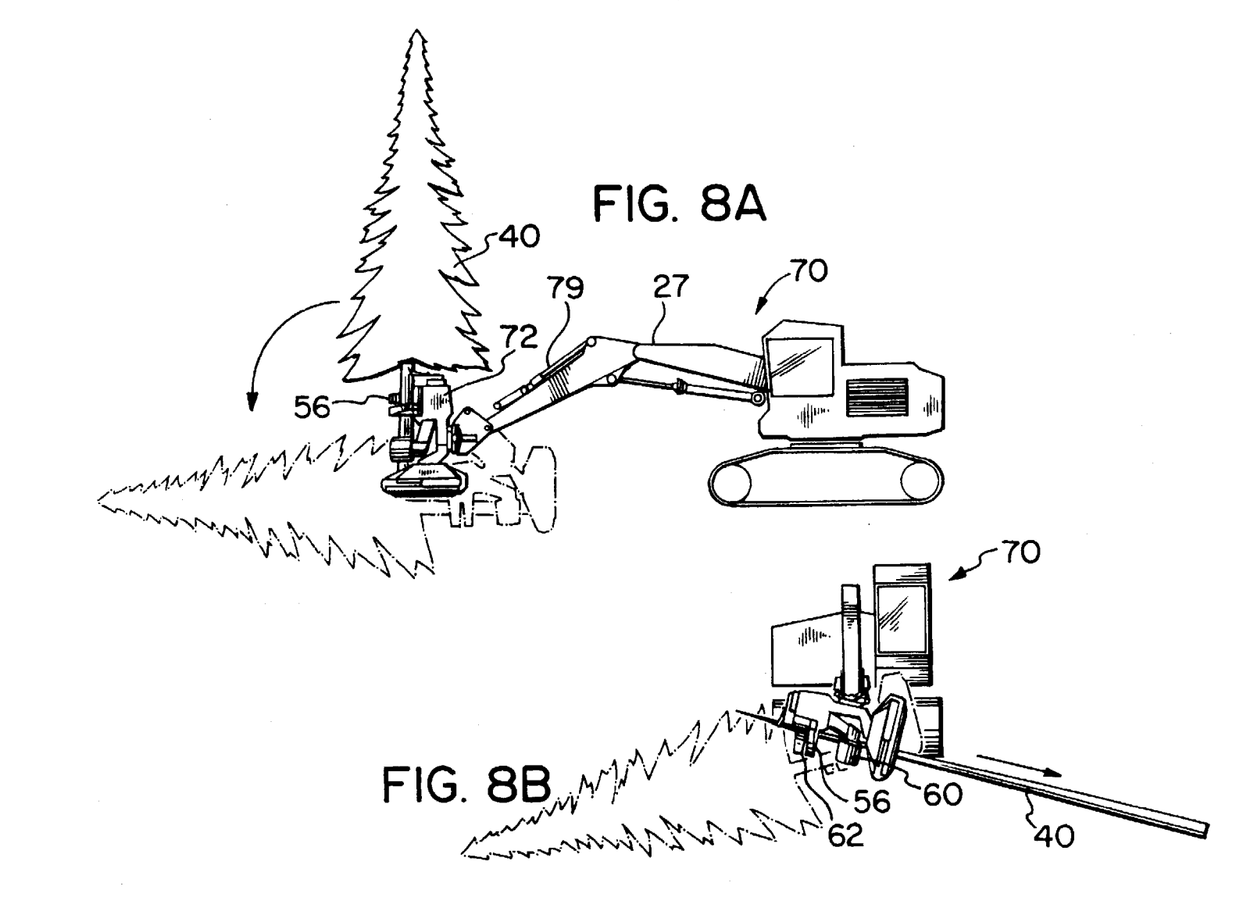
FIGS. 8A and 8B are schematic illustrations showing a feller processor according to the invention felling and processing a tree.

FIGS. 8A and 8B show the stages in processing a tree with feller processor 70. In FIG. 8A(solid outline) the operator has aligned head 72 with a tree 40, clamped head 72 to tree 40 with grapples 56 and is cutting tree 40 by advancing high speed saw 76. As indicated in dotted outline, when tree 40 has been cut, the operator causes tree 40 to fall. Typically the operator will cause the tree to fall to one side or the other and somewhat away from feller processor 70. In FIG. 8A, the tree has fallen away from and slightly toward the right hand side of feller processor 70. As the tree falls the operator typically releases both of hydraulic motors 92 and power actuator 79. While tree 40 is falling, head 72 is prevented from turning about axis 38 by power actuators 90. As tree 40 falls, head 72 pivots about axes 36 and 37. When this happens, high speed saw 76 exerts a torque on head 72 which tends to cause head 72 to twist about an axis that is perpendicular to both the axis of rotation of high speed saw 78 and pivot axis 37. This gyroscopically created torque is initially controlled by the inertia presented by tree 40 and by power actuator 79, and, as head 72 continues to turn about axis 37, it is also borne by power actuators 90.

After the tree has been felled the operator can process the tree as shown in FIG. 8B. In FIG. 8B, the operator has extended power actuator 79 until tilt member 78 and pivot axis 38 are both generally horizontal. The operator has also turned head 72 around axis 37 to position tree 40(and the longitudinal axis of head 72) perpendicular to axis 38 and released power actuators 90 so that head 72 can "float" relative to axis 38 of pivot joint 82. As noted above, power actuators 90 previously held head 72 rigidly with respect to axis 38.

It is unnecessary for second member 81 to float except when a tree is being processed. When a tree is being processed, power actuator 79 is always extended so that first member 78 is generally horizontal. Therefore the control for causing power actuators 90 to float is preferably interlocked with the control for extending power actuator 79 so that power actuators 90 can be placed in floating mode only when first member 78 is being tilted through at least a minimum angle toward the horizontal. For example, the interlock may allow power actuators 90 to be placed in floating mode only when power actuator 79 has been extended sufficiently to tilt first member 78 to within a few degrees of being horizontal.

In FIG. 8B, (view shown in dotted outline) tree 40 is gripped and supported by feed rolls 60. In FIG. 8B (view shown in solid outline) the operator has engaged feed rolls 60 and driven tree 40 past de-limbing knives 62 on arms 56 thereby removing the branches from tree 40. Head 72 freely tilts from side to side about axis 38 to follow the contours of tree 40. Any gyroscopic forces generated by high speed saw 76 can be resisted by power actuators 92 which may be used to lock rotary joint 84.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A tree felling and processing machine comprising:
   (a) a boom (27) having an end mounted to a vehicle and a free end;
   (b) a first member (78) pivotally mounted to said free end of said boom for pivoting about a first generally horizontal axis (36);
   (c) a hydraulic cylinder (79) linked between said boom (27) and said first member (78) for tilting said first member (78) about said first axis (36);
   (d) a second member (81) pivotally mounted to said first member (78) for pivoting about a second axis (38) perpendicular to said first axis (36);
   (e) a second actuator (90) linked between said first member (78) and said second member (81) for tilting said second member (81) about said second axis (38);
   (f) a hydraulic control circuit for selectively causing said second actuator (90) to either float or to firmly hold said second member (81) at a selected degree of tilt relative to said first member (78);
   (g) a processor head (72) mounted to said second member (81) by a rotary coupling (84), said rotary coupling (84) permitting said processor head (72) to pivot about a third axis (37) perpendicular to said first and second axes (36, 38), said processor head (72) comprising:
      (i) a tree-engaging grapple for engaging a tree while the tree is cut;
      (ii) tree processing means; and
      (iii) a tree feeder for moving a cut tree past said tree processing means; and,
      (iv) a substantially continuously rotating circular saw for cutting said tree;
   (h) a ring gear (94) on said second member (81); and
   (i) a motor (92) on said processor head (72) driving a pinion gear (93) engaged with said ring gear (94) for rotating said processor head (72) about said third axis (37).

2. The tree felling and processing machine of claim 1 wherein said control circuit is equipped with an interlock which permits said control circuit to allow said hydraulic cylinder (90) to float only when said first member (78) has been tilted through at least a minimum angle with respect to said boom.

3. The tree felling and processing machine of claim 1 comprising two hydraulic motors (92) on said processor head (72), each of said hydraulic motors driving a pinion gear (93) engaged with said ring gear (94) for rotating said processor head (72) about said third axis (37).

4. A tree felling and processing machine comprising:
   (a) a boom having an end mounted to a vehicle and a free end;
   (b) a first member pivotally mounted to said free end of said boom for pivoting about a first generally horizontal axis;
   (c) a first axis power actuator linked between said boom and said first member for tilting said first member about said first axis;
   (d) a second member pivotally mounted to said first member for pivoting about a second axis perpendicular to said first axis;
   (e) a second axis actuator linked between said first member and said second member for tilting said second member about said second axis;
   (f) a hydraulic control circuit for selectively causing said second actuator to either float or to firmly hold said second member at a selected degree of tilt relative to said first member;
   (g) a processor head mounted to said second member by a rotary coupling, said rotary coupling permitting said processor head to pivot about a third axis perpendicular to said first and second axes, said processor head comprising:
      (i) a tree-engaging grapple for engaging a tree while the tree is out;
      (ii) tree processing mean; and
      (iii) a tree feeder for moving a cut tree past said tree processing means; and,
      (iv) a substantially continuously rotating circular saw for cutting said tree;
   (h) a ring gear on said second member; and
   (i) a third axis power actuator on said processor head the third axis power actuator driving a pinion gear engaged with said ring gear for rotating said processor head about said third axis.

5. The tree foiling and processing machine of claim 4 wherein said control circuit is equipped with an interlock which permits said control circuit to allow said hydraulic cylinder to float only when said first member has been tilted through at least a minimum angle with respect to said boom.

6. The tree foiling and processing machine of claim 4 wherein said third axis power actuator comprises two hydraulic motors on said processor head, each of said hydraulic motors driving a pinion gear engaged with said ring gear for rotating said processor head about said third axis.

7. The tree felling and processing machine of claim 4 wherein said third axis power actuator comprises a rotary motor driving a pinion gear engaged with said ring gear.

* * * * *